United States Patent [19]

Rutten et al.

[11] Patent Number: 4,524,300
[45] Date of Patent: Jun. 18, 1985

[54] LUMINESCENT SCREEN AND LAMP CONTAINING THE SAME

[75] Inventors: Joseph Rutten; Gerardus P. F. Hoeks; Johannes T. C. van Kemenade, all of Eindhoven, Netherlands

[73] Assignee: U.S. Philips Corporation, New York, N.Y.

[21] Appl. No.: 607,913

[22] Filed: May 7, 1984

[30] Foreign Application Priority Data

May 13, 1983 [NL] Netherlands ............... 8301713

[51] Int. Cl.$^3$ ............... C09K 11/465; H01J 61/42
[52] U.S. Cl. ............... 313/487; 252/301.4 R; 313/486; 428/690
[58] Field of Search ............... 252/301.4 R; 428/690; 313/486, 487

[56] References Cited

U.S. PATENT DOCUMENTS

| 3,294,699 | 12/1966 | Lange | 252/301.4 R |
| 3,595,802 | 7/1971 | Blasse | 252/301.4 R |
| 3,595,803 | 7/1971 | Dugger | 252/301.4 R |
| 4,071,465 | 1/1978 | Vodoklys | 252/301.4 R X |
| 4,161,457 | 7/1979 | Takahashi et al. | 252/301.4 R |
| 4,441,049 | 4/1984 | Verstegen et al. | 252/301.4 R X |

FOREIGN PATENT DOCUMENTS 82570 of 0000 European Pat. Off. ..... 252/301.4 R

Primary Examiner—Jack Cooper
Attorney, Agent, or Firm—Norman N. Spain

[57] ABSTRACT

A luminescent screen provided with a luminescent layer formed on a carrier, which layer comprises an aluminate and/or a gallate of strontium and/or barium activated by bivalent europium or by trivalent chromium. The aluminate and/or gallate has an orthorhombic crystal structure with a space group $P_{nnm}$ and has a composition defined by the formula $Me_{2-x}Eu_xA_{6-y}Cr_yO_{11}$ (Me = Sr, Ba and A — Al, Ga).

An advantageous application of such a luminescent screen is found in low-pressure mercury vapor discharge lamps.

7 Claims, 3 Drawing Figures

LUMINESCENT SCREEN AND LAMP CONTAINING THE SAME

The invention relates to a luminescent screen provided with a carrier on which is formed a luminescent layer which comprises a luminescent material which is activated by bivalent europium or by trivalent chromium and which is an aluminate and/or a gallate of strontium and/or barium. The invention further relates to a low-pressure mercury vapour discharge lamp provided with such a luminescent screen.

British Patent Specification No. 1,190,520 discloses luminescent aluminates which are activated by bivalent europium, the fundamental lattice of which is defined by the formula $MeAl_{12}O_{19}$ (Me=Ba, Sr, and/or Ca). These known aluminates are efficiently luminescent materials and have a characteristic hexagonal crystal structure which bears a strong resemblance to that of the mineral magnetoplumbite and also to $\beta$-aluminate which is closely related to magnetoplumbite with regard to its structure. The europium-activated strontium aluminate has, when excited by, for example, ultraviolet radiation, an emission band in the deep blue part of the spectrum with a maximum at approximately 400 nm and a half-value width of approximately 60 nm. The known europium-activated barium aluminate has an emission band with a maximum at approximately 440 nm and a half-value width of approximately 60 nm.

U.S. Pat. No. 3,294,699 discloses a luminescent strontium aluminate activated by bivalent europium and having a fundamental lattice according to the formula $SrAl_2O_4$. This known aluminate has a monoclinic crystal structure and exhibits an emission band in the green part of the spectrum with a maximum at approximately 520 nm.

British Patent Specification No. 1,205,659 discloses a luminescent barium aluminate activated by bivalent europium and having a composition according to the formula $BaAl_2O_4$, in which the barium can be replaced in part by strontium. This aluminate has a hexagonal crystal structure (but not that of magnetoplumbite or $\beta$-aluminate). The europium-activated barium aluminate has an emission band at approximately 500 nm.

An article in the magazine Sov.Phys.Crystallogr., vol. 21, No. 4, p. 471, 1976 discloses a crystalline strontium aluminate having an Sr:Al ratio of 2:7. This aluminate has an orthorhombic crystal structure with a space group $P_{mma}$ (crystal axes $a=24.78$, $b=8.49$ and $c=4.89$). The still unpublished Dutch Patent Application No. 820,1943 (PHN 10347) discloses the activation of this aluminate by bivalent europium. It appears from the said Patent Application that the aluminate can be obtained starting from Sr:Al ratios of 2:4 to 2:10 and that up to 25 mol. % of the strontium can be replaced by calcium whilst maintaining the crystal structure. The said Patent Application further shows that the europium-activated strontium aluminate has an emission band with a maximum at approximately 490 nm and a half-width value of approximately 60 nm.

A crystalline compound according to the formula $Ba_2Fe_6O_{11}$ is known from J. Solid State Chem., 29 101-108, 1979. This compound has an orthorhombic crystal structure, like the just-mentioned strontium aluminate, but with a quite different symmetry, i.e. with the space group $P_{nnm}$ (crystal axes $a=23.02$, $b=5.18$ and $c=8.90$). An aluminate having the same crystal structure, i.e. $Sr_{1.33}Pb_{0.67}Al_6O_{11}$ (crystal axes $a=22.13$, $b=4.88$ and $c=8.42$) is described in Z. An. org. Allg. Chem. 491, 253-258, 1982. This aluminate is prepared with the aid of a PbO melt.

Experiments leading to the invention have shown that aluminates and/or gallates of strontium and/or barium can be obtained having the same orthorhombic crystal structure as the aforementioned $Ba_2Fe_6O_{11}$.

The invention has for its object to provide luminescent screens comprising novel luminescent materials having an efficient emission in spectral ranges important for practical applications.

A luminescent screen according to the invention is provided with a carrier on which a luminescent layer is formed which comprises a luminescent material which is activated by bivalent europium or by trivalent chromium and which is an aluminate and/or a gallate of strontium and/or barium, and is characterized in that the aluminate and/or gallate has an orthorhombic crystal structure with a space group $P_{nnm}$ and has a composition defined by the formula $Me_{2-x}Eu_xA_{6-y}Cr_yO_{11}$, in which Me is mainly strontium or mainly barium, in that, when Me is mainly strontium, the Me is strontium of which up to 25 mol.% can be replaced by barium, while A is aluminium of which up to 25 mol.% can be replaced by gallium, where $0.001 \leq x \leq 0.25$ and $y=0$, and in that, when Me is mainly barium, the Me is barium of which up to 50 mol.% can be replaced by strontium, while A is gallium of which up to 25 mol. % can be replaced by aluminium, where $0.001 \leq y \leq 0.10$ and $x=0$.

It has been found that strontium aluminate $Sr_2Al_6O_{11}$ can be formed having the orthorhombic structure of the $P_{nnm}$ type. It has then been found that Sr can be partly replaced by Ba and the Al can be partly replaced by Ga whilst maintaining the crystal structure. If more than 25 mol.% of the Sr or more than 25 mol.% of the Al is replaced, however, an undesirable number of subphases are obtained. Such high substitutions are therefore not used. It has also been found that barium gallate $Ba_2Ga_6O_{11}$ having the same structure can be prepared, whereby the Ba can be partly replaced by Sr and the Ga can be partly replaced by Al. Substitutions of more than 50 mol.% of the Ba or more than 25 mol.% of the Ga are not used to avoid excessively large quantities of undesired subphases. The pure strontium gallates or barium aluminates having the said structure could not be obtained. The analogous calcium compounds where not formed either. It is noted that very small quantities of calcium (for example up to 1 mol.%) instead of the Sr and/or Ba are not disturbing. However, the calcium has no advantages and larger quantities lead to the formation of other phases than the desired phases.

Activation of the novel aluminates by bivalent europium and of the novel gallates by trivalent chromium leads to very efficiently luminescent materials, which can be excited both by short-wave and by long-wave ultraviolet radiation and also be cathode rays and X-rays. Activation of the aluminates by chromium and of the gallates by europium is not used because then only very small luminous fluxes are obtained. The strontium aluminates activated by bivalent europium have an emission band in the blue part of the spectrum with a maximum at approximately 458 nm and a half-value width of approximately 60 nm. If in these aluminates the strontium is replaced by barium, the emission maximum with increasing barium content is found at longer wavelengths and the half-value width of the emission band slightly increases. Activation of the barium gallates by chromium leads to materials having a red emission in the wavelength range of 650-750 nm with a narrow peak at approximately 695 nm.

It has been found that upon activation by bivalent europium, the most efficiently luminescing materials are obtained if as fundamental lattice strontium aluminate is chosen which does not contain gallium and in which a part of the strontium can be replaced by barium. A luminescent screen according to the invention is then preferred which is characterized in that the luminescent material corresponds to the formula $Sr_{2-p-x}Ba_pEu_xAl_6O_{11}$, in which $0 \leq p \leq 0.50$ and $0.001 \leq x \leq 0.25$. The europium content x then is not chosen to be smaller than 0.001 because at such low values of x the absorption of the excition energy is too small and too small luminous fluxes are obtained. At values of x larger than 0.25 the luminous flux decreases too strongly due to concentration quenching. As already stated above, if strontium is replaced by barium, the emission band in the strontium aluminate lattice is displaced to longer wavelengths, whilst maintaining the crystal structure of the aluminate. The pure strontium aluminate activated by bivalent europium has its emission maximum at approximately 458 nm. The parameters of the unit cell of this material are $a=21.93$, $b=4.89$ and $c=8.41$. Substitution of barium results, with regard to the structure, only in that the unit cell becomes slightly larger (if, for example, in the aforementioned formula p is equal to 0.25, it is found that $a=22.04$ and that b and c are still substantially equal to the aforementioned values for strontium aluminate). At a value of $p=0.50$, the emission maximum lies at approximately 475 nm.

The luminescent screens according to the above preferred embodiment can be used very advantageously in low-pressure mercury vapour discharge lamps, more particularly in such lamps for general illumination purposes. It is then particularly advantageous that by means of a suitable barium substitution, the location of the emission maximum can be adjusted within the limits of 458-475 nm and thus this location can be adapted to given desires. As a result of the high energy conversion efficiency with electron excitation, these screens can also be used very advantageously in cathode-ray tubes.

It has been found that upon activation by chromium, the most efficiently luminescing materials are obtained if barium gallate is chosen as a fundamental lattice, which does not contain aluminium and in which a part of the barium can be replaced by strontium. Therefore, a luminescent screen according to the invention is preferred, which is characterized in that the luminescent material corresponds to the formula $Ba_{2-q}Sr_qGa_{6-y}Cr_yO_{11}$, in which $0 \leq q \leq 1.00$ and $0.001 \leq y \leq 0.10$. The chromium content y is chosen within the given limits because at values of y smaller than 0.001 and larger than 0.10, respectively, too small luminous fluxes are obtained due to too low an absorption of excitation energy and concentration quenching, respectively. When barium is partly replaced by strontium, this has little influence on the luminescent properties for values of the strontium content q up to at most 1.00. The strontium-free barium gallate again has the orthorhombic crstal structure with a space group $P_{nnm}$ and has a slightly larger unit cell ($a=22.87$, $b=5.09$ and $c=8.79$) as compared with the strontium aluminate. Strontium substitution causes the cell parameters of the gallate to decrease slightly (for example, with $q=0.20$, $a=22.85$, $b=5.08$ and $c=8.76$). The luminescent screens according to this embodiment can be used advantageously in low-pressure mercury vapour discharge lamps, more particularly in such lamps for irradiation of plants. The deep red chromium emission with a maximum at approximately 695 nm is in fact very favourable for the growth of plants.

Lamps according to the invention are preferred, which are provided with an aluminate activated by bivalent europium according to the invention and which comprise a green-luminescing material and a red-luminescing material. In fact, these lamps are very efficient for general illumination, while they make it possible to obtain a very satisfactory general colour rendition.

Such lamps are particularly advantageous if the green-luminescing material is activated by terbium and the red-luminescing material is a rare earth oxide activated by trivalent europium.

The luminescent aluminates and/or gallates for use in a luminescent screen according to the invention can generally be prepared by a solid state reaction at high temperature of a starting mixture comprising oxides or oxide-forming compounds of the desired elements in the quantities suitable for the formation of the desired composition. This reaction has to take place in a weakly reducing atmosphere, (for example, a mixture of nitrogen and hydrogen, which contains 1–10% by volume of hydrogen) in the case of activation by europium and in an oxidizing atmosphere, for example, in air, in the case of activation by chromium. It has been found that the choice of the further reaction conditions is important for the formation of the desired crystal phase. Especially the reaction temperature should be comparatively low, for example, 1050°–1200° C. If the reaction temperature is in fact too high, there is a high risk of undesired phases, for example, the $Sr_2Al_7O_{12.5}$ having an orthorhombic structure with a space group $P_{mma}$, being formed. It has further been found that the use of a melting salt, for example boron oxide or boric acid, is very desirable. The quantity of melting salt should then be small because otherwise there is again a high risk of undesired phases being formed. The composition of the starting mixture may deviate from the stoichiometry of the compound to be prepared; especially a deficiency or an excess of aluminium oxide and/or gallium oxide is possible and may have a reaction-promoting effect.

Embodiments of the invention will now be described more fully also with reference to a drawing. In the drawing.

Figure 1:
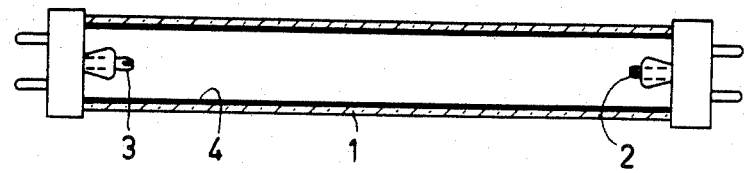
FIG. 1 shows diagrammatically and in sectional view a low-pressure mercury vapour discharge lamp according to the invention.

In FIG. 1, reference numeral 1 denotes the glass wall of a low-pressure mercury vapour discharge lamp. At each end of the lamp an electrode 2, 3 is arranged, between which electrodes the discharge takes place during operation of the lamp. The lamp contains a small quantity of mercury and a rare gas as the starting gas. The wall 1 constitutes a luminescent screen and serves as a carrier for the luminescent layer 4, which comprises a luminescent material according to the invention. The layer 4 can be applied to the wall 1 in a conventional manner, for example, by means of a suspension comprising the luminescent material.

EXAMPLE 1

A mixture of
- 6.801 g of $SrCO_3$
- 7.080 g of $Al_2O_3$
- 0.163 g of $Eu_2O_3$
- 0.090 g of $H_3BO_3$ (0.06 mol of $H_3BO_3$ per mole of aluminate to be formed)

was prepared. This mixture was heated three times in a furnace for 1 hours, 17 hours and 17 hours, respectively, at 1100° C. During heating, a flow of nitrogen containing 5% by volume of hydrogen was passed through the furnace. After each heating, the product obtained was pulverized and sieved.

The luminescent material thus obtained was an aluminate according to the formula $SR_{1.96}Eu_{0.04}Al_6O_{11}$. An X-ray diffraction analysis of the powder showed that the material had the orthorhombic crystal structure with a space group $P_{nnm}$. (Of all the examples still to be given of the novel luminescent materials, the crystal structure was determined in the same manner). It was found that the aluminate had a quantum efficiency of 87% with 254 nm excitation (absorption 85%). The emission band had its maximum at 498 nm and a half-value width of 58 nm.

EXAMPLES 2 TO 6 INCLUSIVE

In the same manner as indicated in Example 1, a number of aluminates having the formula $Sr_{2-x}Eu_xAl_6O_{11}$, were prepared whereby the influence of the europium content x was verified. The starting mixtures containing 0.049 mol of $H_3BO_3$ per mole of aluminate to be formed were heated for 1 hour and twice for 16 hours at 1100° C. in a flow of nitrogen containing 5% by volume of hydrogen which was passed through water before being introduced into the furnace. Measurements of quantum efficiency gr in %, absorption A in % of the exciting 254 nm radiation, emission maximum $\lambda_{max}$ in nm and half-value width $\lambda_{\frac{1}{2}}$ in nm, carried out on the luminescent aluminates obtained, are summarized in Table 1, just like the energy conversion efficiencies $\eta$ (in %) with cathode-ray excitation.

TABLE 1

| Example | x | qr | A | $\lambda_{max}$ | $\lambda_{\frac{1}{2}}$ | $\eta$ |
|---------|-------|----|----|-----|----|-----|
| 2 | 0.002 | 60 | 47 | 455 | 71 | 4 |
| 3 | 0.02 | 81 | 79 | 458 | 61 | 7 |
| 4 | 0.04 | 82 | 86 | 459 | 58 | 7 |
| 5 | 0.06 | 84 | 89 | 459 | 56 | 7.5 |
| 6 | 0.10 | 81 | 92 | 460 | 57 | 8 |

EXAMPLES 7 TO 12 INCLUSIVE

By heating starting mixtures containing 0.035 mol of $H_3BO_3$ per mole of aluminate to be formed for 20 hours at 1100° C. and once more for 20 hours at 1150° C., each time in a flow of nitrogen containing 5% by volume of hydrogen, materials were obtained according to the formula $Sr_{1.98-p}Ba_pEu_{0.02}Al_6O_{11}$. The measurements on these materials, for which the influence of the substitution of strontium for barium is apparent, are summarized in Table 2.

TABLE 2

| Example | p | qr | A | $\lambda_{max}$ | $\lambda_{\frac{1}{2}}$ |
|---------|------|----|----|-----|----|
| 7 | 0 | 73 | 77 | 460 | 64 |
| 8 | 0.04 | 73 | 76 | 461 | 65 |
| 9 | 0.10 | 73 | 78 | 462 | 64 |
| 10 | 0.20 | 74 | 77 | 464 | 64 |
| 11 | 0.30 | 69 | 77 | 470 | 67 |
| 12 | 0.50 | 51 | 77 | 473 | 67 |

EXAMPLES 13 TO 16 INCLUSIVE

The influence of deviations from the stoichiometry in the starting mixtures was verified by preparing a number of compounds according to the formula $Sr_{1.98}Eu_{0.02}Al_zO_{2+1.5z}$. The mixtures which contained 0.029 mol of $H_3BO_3$ per mole of aluminate to be formed were heated three times (1 hour, 65 hours and 17 hours) at 1100° C. in a flow of nitrogen containing 5% by volume of hydrogen. The measurements on the materials obtained are stated in Table 3. In all cases, the desired crystal phase of the aluminate was obtained. However, it was found that at low values of z $SrAl_2O_4$ was present and at high values of z $Sr_2Al_7O_{12.5}$ and $SrAl_4O_7$ were present, but in only slightly disturbing quantities.

TABLE 3

| Example | z | qr | A | $\lambda_{max}$ |
|---------|-----|----|----|-----|
| 13 | 5 | 69 | 77 | 460 |
| 14 | 5.5 | 76 | 75 | 459 |
| 15 | 6 | 79 | 72 | 458 |
| 16 | 6.5 | 79 | 68 | 459 |

EXAMPLES 17 TO 19 INCLUSIVE

Figure 2:
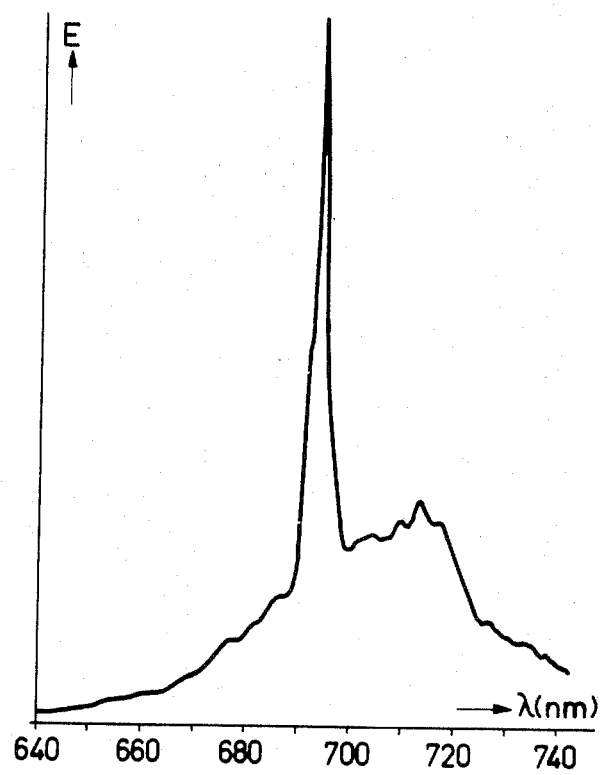
FIG. 2 shows the spectral energy distribution of the emitted radiation of a chromium-activated luminescent material according to the invention.

A mixture of
- 5.424 g of $BaCO_3$
- 7.784 g of $Ga_2O_3$
- 0.006 g of $Cr_2O_3$
- 0.075 g of $H_3BO_3$ was prepared. This mixture was heated for 17 hours in air at 1100° C. After cooling, the product was pulverized and sieved. The luminescent gallate thus obtained had the formula $Ba_2Ga_{5.994}Cr_{0.006}O_{11}$. In an analogous manner, gallates according to the formula $Ba_2Ga_{6-y}Cr_yO_{11}$ with different Cr contents y were prepared. Measurements of quantum efficiency qr (%), absorption A (%) of the exciting 254 nm radiation and emission maximum $\lambda_{max}$(nm) are stated in Table 4. The spectral energy distribution of the emission of the gallate according to Example 17 is shown in FIG. 2 of the drawing. In this Figure, the wavelength $\lambda$ (in nm) is plotted on the abscissa and the relative radiation energy E (in arbitrary units) is plotted on the ordinate.

TABLE 4

| Example | y | qr | A | $\lambda_{max}$ |
|---------|-------|----|----|-----|
| 17 | 0.006 | 43 | 90 | 699 |
| 18 | 0.002 | 35 | 88 | 699 |
| 19 | 0.003 | 41 | 89 | 699 |

EXAMPLES 20 TO 24 INCLUSIVE

In the same manner as indicated for Examples 17 to 19 inclusive, Cr-activated gallates were prepared according to the formula: $Ba_{2-q}Sr_qGa_{5.994}Cr_{0.006}O_{11}$. The influence of the Sr content q appears from the measurements shown in Table 5.

TABLE 5

| Example | q | qr | A | $\lambda_{max}$ |
| --- | --- | --- | --- | --- |
| 20 | 0 | 37 | 86 | 699 |
| 21 | 0.02 | 39 | 86 | 699 |
| 22 | 0.20 | 40 | 85 | 699 |
| 23 | 0.50 | 40 | 86 | 699 |
| 24 | 1.00 | 50 | 88 | 699 |

EXAMPLE 25

Figure 3:
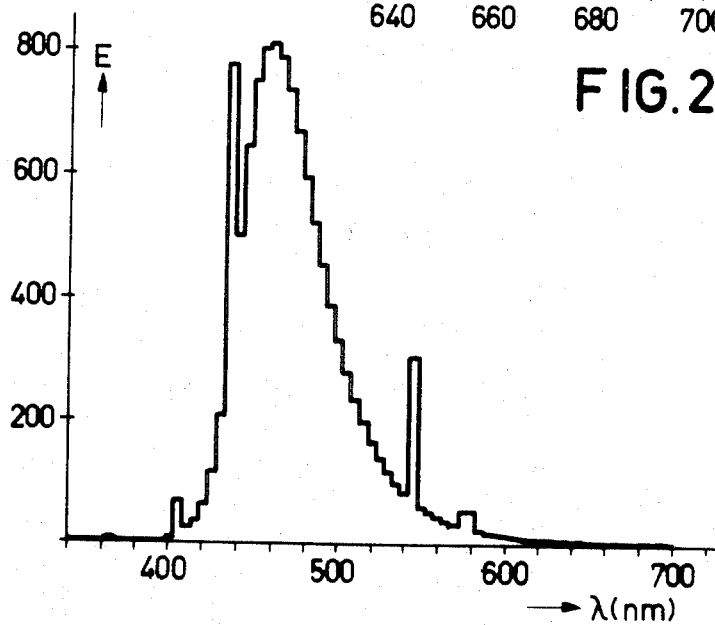
FIG. 3 shows the spectral energy distribution of the emitted radiation of a lamp according to the invention provided with a luminescent material activated by bivalent europium.

A larger quantity of europium-activated strontium aluminate according to the formula $Sr_{1.96}Eu_{0.04}Al_6O_{11}$ was obtained by heating a mixture of 352.56 g of $SrCO_3$
367.06 g of $Al_2O_3$
8.45 g of $Eu_2O_3$
2.59 g of $H_3BO_3$ for 1 hour at 1100° C. in a flow of nitrogen containing 5% by volume of hydrogen. After cooling and pulverization, the product was subjected to the same heating for 65 hours. 0.2% by weight of $H_3BO_3$ was added to the product thus obtained, after which this product was heated for 16 hours at 1100° C. in the same weakly reducing atmosphere. After cooling and pulverisation, again 0.2% by weight of $H_3BO_3$ was mixed with the product, after which a heating took place again for 16 hours at 1100° C. in the same atmosphere. After cooling, pulverization and sieving, the luminescent material was ready for use. It was found that the aluminate had with 254 nm excitation (absorption 88%) a quantum efficiency of 83%. The material was provided in the luminescent screen of a low-pressure mercury vapour discharge lamp of the kind shown with reference to FIG. 1 (lamp length approximately 120 cm, diameter 26 mm, power consumption approximately 36 W). Initially the lamp supplied a relative luminous flux of 45.4 lm/W. The relative luminous flux was after 0, 100 and 1000 operating hours 1020, 100 and 93.6%, respectively. The spectral energy distribution of the radiation emitted by the lamp is shown in FIG. 3, in which the relative radiation energy E per wavelength interval of 5 nm (in arbitrary units) is plotted against the wavelength λ. The colour point of the emitted radiation was x=0.152 and y=0.138.

EXAMPLE 26

A larger quantity of a europium-activated barium-containing strontium aluminate according to the formula $Sr_{1.65}Ba_{0.33}Eu_{0.02}Al_6O_{11}$ was prepared by preparing an intimate mixture of 69.15 g of $BaCO_3$
263.39 g of $SrCO_3$
352.89 g of $Al_2O_3$
3.75 g of $Eu_2O_3$
6.58 g of $H_3BO_3$.

This mixture, which contained in excess a quantity 8.33 mol.% of Al, was heated three times (each time for 2 hours) in a furnace at 1200° C. in a weakly reducing atmosphere consisting of a flow of nitrogen which contained 5% by volume of hydrogen and which, before being introduced into the furnace, was passed through water. The aluminate obtained had with 254 nm excitation (absorption 83%) a quantum efficiency of 78%. When the product was provided in low-pressure mercury vapour discharge lamps of the kind mentioned in Example 25, relative luminous fluxes were obtained of 50 lm/W after 100 operating hours. The relative luminous flux was after 0, 100, 1000, 2000 and 5000 operating hours 103.3, 100, 89.6, 85.2 and 78.7%, respectively. The colour point of the radiation emitted by the lamp was x=0.152 and y=0.175.

EXAMPLE 27

A lamp of the kind mentioned in Example 25 (36 W) was provided with a luminescent screen, containing a mixture of a luminescent aluminate as described in Example 25 ($Sr_{1.96}Eu_{0.04}Al_6O_{11}$), a green-luminescing aluminate of the formula $Ce_{0.67}Tb_{0.33}MgAl_{11}O_{19}$ and a red-luminescing oxide of the formula $Y_2O_3$-$Eu^3$ in such relative proportions that the colour temperature of the radiation emitted by the lamp had a value of approximately 4000 K. Initially the lamp supplied a relative luminous flux of 95.3 lm/W. The relative luminous flux was after 0, 100, 1000 and 2000 operating hours 100.7, 100, 98.5 and 95.9% respectively.

Finally, it is noted that lead can be incorporated in the strontium aluminate $Sr_2Al_6O_{11}$. If the quantity of lead is chosen to be small (or the order of a few mol.% with respect to the strontium), materials are obtained having a reasonably efficient lead emission (emission band in the UV with a maximum at approximately 307 nm).

What is claimed is:

1. A luminescent screen provided with a carrier on which is formed a luminescent layer which comprises a luminescent material activated by bivalent europium or by trivalent chromium, which material is an aluminate and/or a gallate of strontium and/or barium, characterized in that the aluminate and/or gallate has an orthorhombic crystal structure with a space group $P_{nnm}$ and has a composition defined by the formula $Me_{2-y}Eu_x A_{6-q}Cr_yO_{11}$, in which Me is mainly strontium or mainly barium, in that, when Me is mainly strontium, the Me is strontium of which up to 25 mol.% can be replaced by barium, A is aluminium of which up to 25 mol.% can be replaced by gallium, where $0.001 \leq x \leq 0.25$ and y=0, and in that, when Me is mainly barium, the Me is barium of which up to 50 mol.% can be replaced by strontium, A is gallium of which up to 25 mol.% can be replaced by aluminium, where $0.001 \leq y \leq 0.10$ and x=0.

2. A luminescent screen as claimed in claim 1, characterized in that the luminescent material corresponds to the formula $Sr_{2-p-x}Ba_pAl_6O_{11}$, in which $0 \leq p \leq 0.50$ and $0.001 \leq x \leq 0.25$.

3. A luminescent screen as claimed in claim 1, characterized in that the luminescent material corresponds to the formula $Ba_{2-q}Sr_qGa_{6-y}Cr_yO_{11}$, in which $0 \leq q \leq 1.00$ and $0.001 \leq y \leq 0.10$.

4. A low-pressure mercury vapour discharge lamp provided with a luminescent screen as claimed in claim 1.

5. A lamp as claimed in claim 4, characterized in that the luminescent material is defined by the formula $Sr_{2-p-x}Ba_pEu_xAl_6O_{11}$, in which $0 \leq p \leq 0.50$ and $0.001 \leq x \leq 0.25$.

6. A lamp as claimed in claim 5, characterized in that the lamp further comprises a green luminescing material and a red-luminescing material.

7. A lamp as claimed in claim 6, characterized in that the green-luminescing material is activated by terbium and the red-luminescing material is a rare earth metal oxide activated by trivalent europium.

* * * * *